US010523145B2

United States Patent
Shimada et al.

(10) Patent No.: US 10,523,145 B2
(45) Date of Patent: Dec. 31, 2019

(54) MOTOR CONTROL CIRCUIT, MOTOR CONTROL DEVICE, ACTUATOR AND CONTROL METHOD FOR STEPPING MOTOR

(71) Applicant: MINEBEA MITSUMI Inc., Nagano (JP)

(72) Inventors: Ayaka Shimada, Fukuroi (JP); Kazuo Takada, Kosai (JP); Hidetoshi Hijikata, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/275,736

(22) Filed: Feb. 14, 2019

(65) Prior Publication Data

US 2019/0181785 A1  Jun. 13, 2019

Related U.S. Application Data

(63) Continuation of application No. PCT/JP2017/027462, filed on Jul. 28, 2017.

(30) Foreign Application Priority Data

Aug. 22, 2016 (JP) .................. 2016-161974

(51) Int. Cl.
*H02P 8/00* (2006.01)
*H02P 8/38* (2006.01)
*H02P 8/12* (2006.01)

(52) U.S. Cl.
CPC . *H02P 8/38* (2013.01); *H02P 8/12* (2013.01)

(58) Field of Classification Search
CPC .................. H02P 8/38; H02P 8/12
(Continued)

(56) References Cited

U.S. PATENT DOCUMENTS

2014/0176039 A1   6/2014  Takada et al.

FOREIGN PATENT DOCUMENTS

EP   0 887 534 A2   12/1998
JP   07-170790 A   7/1995
(Continued)

OTHER PUBLICATIONS

Written Opinion for corresponding International Application No. PCT/JP2017/027462 dated Aug. 29, 2017.
(Continued)

*Primary Examiner* — Erick D Glass
(74) *Attorney, Agent, or Firm* — Pearne & Gordon LLP

(57) ABSTRACT

A motor control circuit (12) capable of performing a high-precision step-out determination under a wide range of conditions. The motor control circuit (12) includes an input voltage measuring unit (125), a temperature measuring unit (128), a back electromotive force measuring unit (126), a determination threshold value setting unit, and a determination unit. The input voltage measuring unit (125) measures an input voltage input to a motor control device (10). The temperature measuring unit (128) measures temperature. The back electromotive force measuring unit (126) measures back electromotive force induced in a coil for which energization is stopped out of the coils of plural phases. The determination threshold value setting unit sets a determination threshold value of back electromotive force based on a measurement result of the input voltage measuring unit (125) and a measurement result of the temperature measuring unit (128), and based on a determination reference value that is preset for each of plural partial areas sectioned in a matrix form with a threshold value relating to the input voltage and a threshold value relating to the temperature. The determination unit makes a determination on step-out of a stepping motor (20) based on a measurement result of the
(Continued)

back electromotive force measuring unit (126) and the set determination threshold value of the back electromotive force.

6 Claims, 6 Drawing Sheets

(58) Field of Classification Search
USPC .......................................................... 318/696
See application file for complete search history.

(56) References Cited

FOREIGN PATENT DOCUMENTS

| JP | 11-018491 A | 1/1999 |
|----|-------------|--------|
| JP | 11-294196 A | 10/1999 |
| JP | 2003-183572 A | 7/2003 |
| JP | 2014-128070 A | 7/2014 |

OTHER PUBLICATIONS

International Preliminary Report on Patentability for corresponding International Application No. PCT/JP2017/027462 dated Feb. 26, 2019.
Japanese Office Action for Application No. 2016-161974, dated Apr. 16, 2019.
International Search Report for corresponding International Application No. PCT/JP2017/027462 dated Aug. 29, 2017.

MOTOR CONTROL CIRCUIT, MOTOR CONTROL DEVICE, ACTUATOR AND CONTROL METHOD FOR STEPPING MOTOR

CROSS REFERENCE TO RELATED APPLICATIONS

The present application is a continuation application of International Patent Application No. PCT/JP2017/027462 filed on Jul. 28, 2017, which claims the benefit of Japanese Patent Application No. 2016-161974, filed on Aug. 22, 2016. The contents of these applications are incorporated herein by reference in their entirety.

BACKGROUND

Technical Field

The present disclosure relates to a motor control circuit, a motor control device, an actuator, and a control method for a stepping motor, and particularly relates to a motor control circuit used for an actuator using a stepping motor, a motor control device, an actuator and a control method for a stepping motor.

Background

Stepping motors have various features such as being stepping motors easy to control, and are widely used for various actuators and the like (for example, see Japanese Patent Application Laid-Open No. H07-170790 described below).

A motor control device used for such an actuator and for controlling the driving of a stepping motor reads the value of a back electromotive force of the stepping motor and performs a step-out determination on the stepping motor.

Japanese Patent Application Laid-Open No. 2003-183572 discloses a motor control device in which a detection threshold value of a back electromotive force is set according to the temperature so as to match with the torque of a motor which fluctuates depending on an ambient temperature.

SUMMARY

In an environment where such an actuator using a stepping motor is used, the temperature or an input voltage input to the motor control device may vary. Furthermore, an actuator capable of appropriately operating in a wide temperature range or a wide input-voltage range has been required. However, it has been difficult to operate a stepping motor so as to satisfy set specifications in a wide use environment in which the temperature or the condition of the input voltage changes.

When the stepping motor is driven by using the motor control device as described in the foregoing Japanese Patent Application Laid-Open No. 2003-183572, the threshold value of the back electromotive force for step-out determination is changed according to the temperature, but the threshold value is not changed according to the input voltage. Since the torque of the stepping motor varies depending on an input voltage, it is impossible to set a threshold value suitable for an entire range where the input voltage may vary, and the precision of the step-out determination may deteriorate depending on the magnitude of the input voltage.

Especially, the dependence of the back electromotive force on the input voltage increases under a low temperature condition. When the threshold value is set to a low value in order to secure the torque under application of a low voltage, the determination precision of the step-out determination would deteriorate under application of a high voltage. On the other hand, when the threshold value is set to a high value in order to secure the determination precision under application of a high voltage, it would be impossible to secure the torque of the stepping motor under application of a low voltage.

The present disclosure is related to providing a motor control circuit, a motor control device, an actuator, and a control method for a stepping motor that can perform step-out determination with high precision under wide conditions.

According to an aspect of the present disclosure, a motor control circuit for use in a motor control device for driving a stepping motor comprises an input voltage measuring unit for measuring an input voltage input to the motor control device, a temperature measuring unit for measuring temperature; a back electromotive force measuring unit for measuring back electromotive force induced in a coil for which energization is stopped out of coils of a plurality of phases in the stepping motor, a determination threshold value setting unit for setting a determination threshold value of back electromotive force for making a determination on step-out of the stepping motor based on a measurement result of the input voltage measuring unit and a measurement result of the temperature measuring unit, and a determination unit for making a determination on step-out of the stepping motor based on a measurement result of the back electromotive force measuring unit and the determination threshold value set by the determination threshold value setting unit, wherein the determination threshold value setting unit sets the determination threshold value based on a determination reference value of the back electromotive force that is preset for each of a plurality of partial areas sectioned in a matrix form with a threshold value relating to the input voltage and a threshold value relating to the temperature.

Preferably, the determination threshold value setting unit sets the determination threshold value based on the determination reference value that is preset for each of nine partial areas sectioned in a matrix form of 3 rows and 3 columns with two threshold values relating to the input voltage and two threshold values relating to the temperature.

Preferably, with respect to respective ranges of a low voltage range, a middle voltage range and a high voltage range that are sectioned by the two threshold values for the input voltage, the determination reference value is set to be large in the middle voltage range than that in the low voltage range, and also larger in the high voltage range than that in the middle voltage range, and also with respect to respective ranges of a low temperature range, a middle temperature range and a high temperature range that are sectioned by the two threshold values for the temperature, the determination reference value is set to be larger in the high temperature range than that in the low temperature range and also larger in the middle temperature range than that in the high temperature range.

According to another aspect of the present disclosure, a motor control device comprises the motor control circuit described above and a drive circuit for driving the stepping motor, wherein the motor control circuit outputs a control signal for controlling the drive circuit, and the drive circuit makes the drive current flow through a coil of the stepping motor based on the control signal.

According to another aspect of the present disclosure, an actuator comprises a stepping motor for generating driving force, the motor control circuit described above, and a driving circuit for causing a drive current to flow through a coil of the stepping motor based on a control signal output from the motor control circuit.

According to a further aspect of the present disclosure, a control method for a stepping motor having coils of a plurality of phases comprises an input voltage measuring step of measuring an input voltage, a temperature measuring step of measuring temperature, a determination threshold value setting step of setting a determination threshold value of back electromotive force for performing a determination on step-out of the stepping motor based on a measurement result in the input voltage measuring step and a measurement result in the temperature measuring step, a back electromotive force measuring step of measuring back electromotive force induced in a coil for which energization is stopped out of the coils of the plurality of phases, and a determination step of making a determination on step-out of the stepping motor based on a measurement result in the back electromotive force measuring step and the determination threshold value set in the determination threshold value setting step, wherein the determination threshold value setting step sets the determination threshold value based on a determination reference value of the back electromotive force that is preset for each of a plurality of partial areas sectioned in a matrix form with a threshold value relating to the input voltage and a threshold value relating to the temperature.

According to these disclosures, it is possible to provide a motor control circuit, a motor control device, an actuator, and a control method of a stepping motor that can perform a high-precision step-out determination under a wide condition.

DETAILED DESCRIPTION

A motor control device according to an embodiment of the present disclosure will be described hereinafter.

The motor control device is, for example, a device for driving a stepping motor having coils of plural phases. The motor control device controls the energization state of the coil of each phase so as to drive the stepping motor. In the present embodiment, the motor control device includes a drive circuit for energizing the coils of the stepping motor, and a motor control circuit for controlling the drive circuit.

An actuator is constituted by a motor control device, a stepping motor driven by the motor control device, and other mechanical parts. In the actuator, the stepping motor is supplied with drive power from the drive circuit to be driven. In the actuator, the drive circuit is controlled by the motor control circuit, whereby the driving of the stepping motor is controlled.

Embodiment

Figure 1:
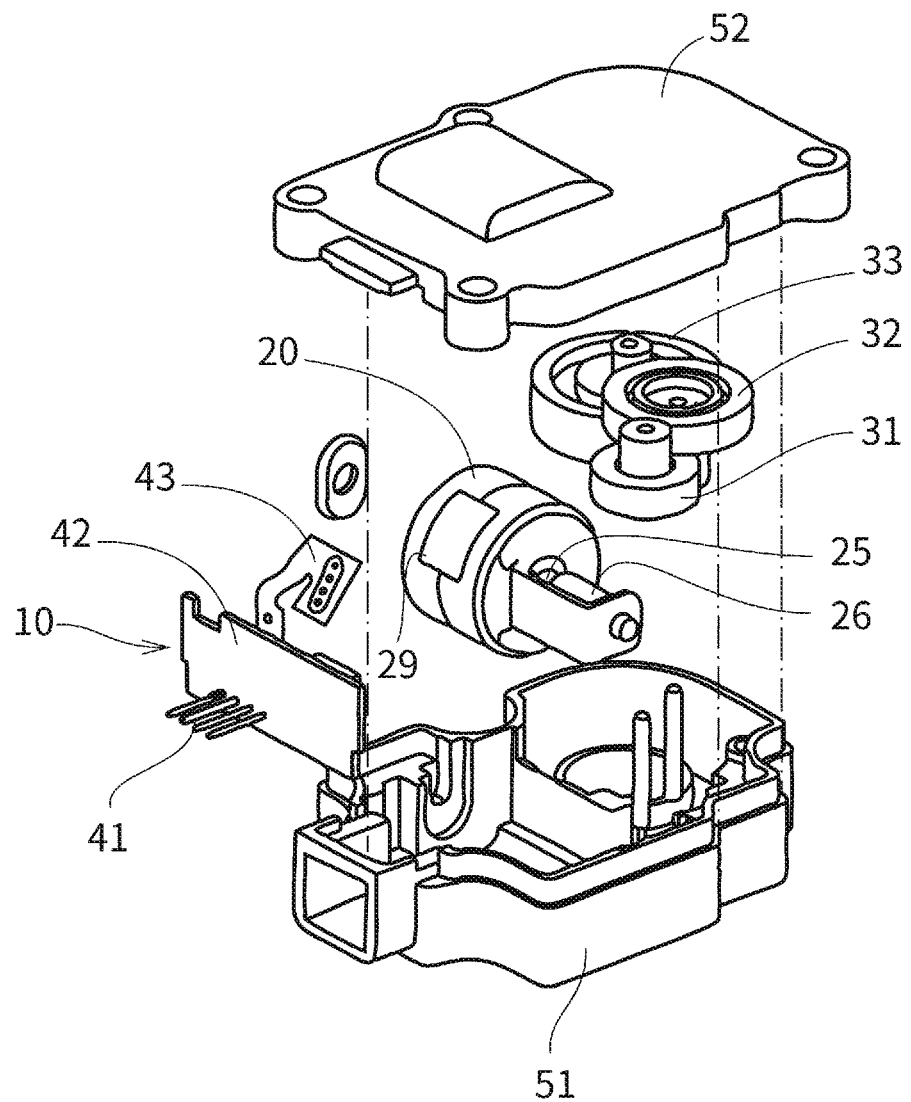
FIG. 1 is an exploded perspective view showing an example of an actuator for which a motor control device according to an embodiment is used.

FIG. 1 is an exploded perspective view showing an example of an actuator for which the control device according to the embodiment is used.

As shown in FIG. 1, the actuator 1 is covered by a case 51 and a cover 52. A motor control device 10, a stepping motor 20, a secondary gear 31, a tertiary gear 32, an output gear 33, and the like are accommodated in the actuator 1. An external output gear provided to the output gear 33 is exposed on the bottom surface of the case 51, and the driving force of the actuator 1 is transmitted to the outside by the external output gear.

The stepping motor 20 generates the driving force of the actuator 1. A primary gear 26 is attached to an output shaft 25 of the stepping motor 20. The primary gear 26 of the stepping motor 20 meshes with the secondary gear 31. The secondary gear 31 meshes with the tertiary gear 32. The tertiary gear 32 meshes with the output gear 33.

The motor control device 10 includes a printed circuit board 42, a flexible printed circuit board 43 for connecting the printed circuit board 42 and a motor terminal 29 of the stepping motor 20, and the like. The printed circuit board 42 is provided with a drive circuit 14 (shown in FIG. 2) for driving the stepping motor 20, a motor control circuit 12 (shown in FIG. 2) for controlling the drive circuit 14, and the like. External connection terminals 41 exposed to the outside of the case 51 and the cover 52 are provided to the printed circuit board 42. A voltage is input from the outside to the motor control device 10 via the external connection terminals 41 or an instruction signal from external equipment is received, whereby the motor control device 10 operates.

The motor control device 10 supplies drive power to the stepping motor 20 based on an input voltage to drive the stepping motor 20. When the stepping motor 20 is driven, the primary gear 26 rotates together with the output shaft 25. The driving force of this rotation is sequentially transmitted to the secondary gear 31, the tertiary gear 32, the output gear 33, and the external output gear, and output to the outside by the external output gear.

It is to be noted that the circuits accommodated inside the case 51 and the cover 52 may be, for example, only the drive circuit 14. In this case, the motor control device 10 may be constituted by the drive circuit 14 inside the case 51 and the cover 52, and the external motor control circuit 12 connected to the drive circuit 14.

Figure 2:
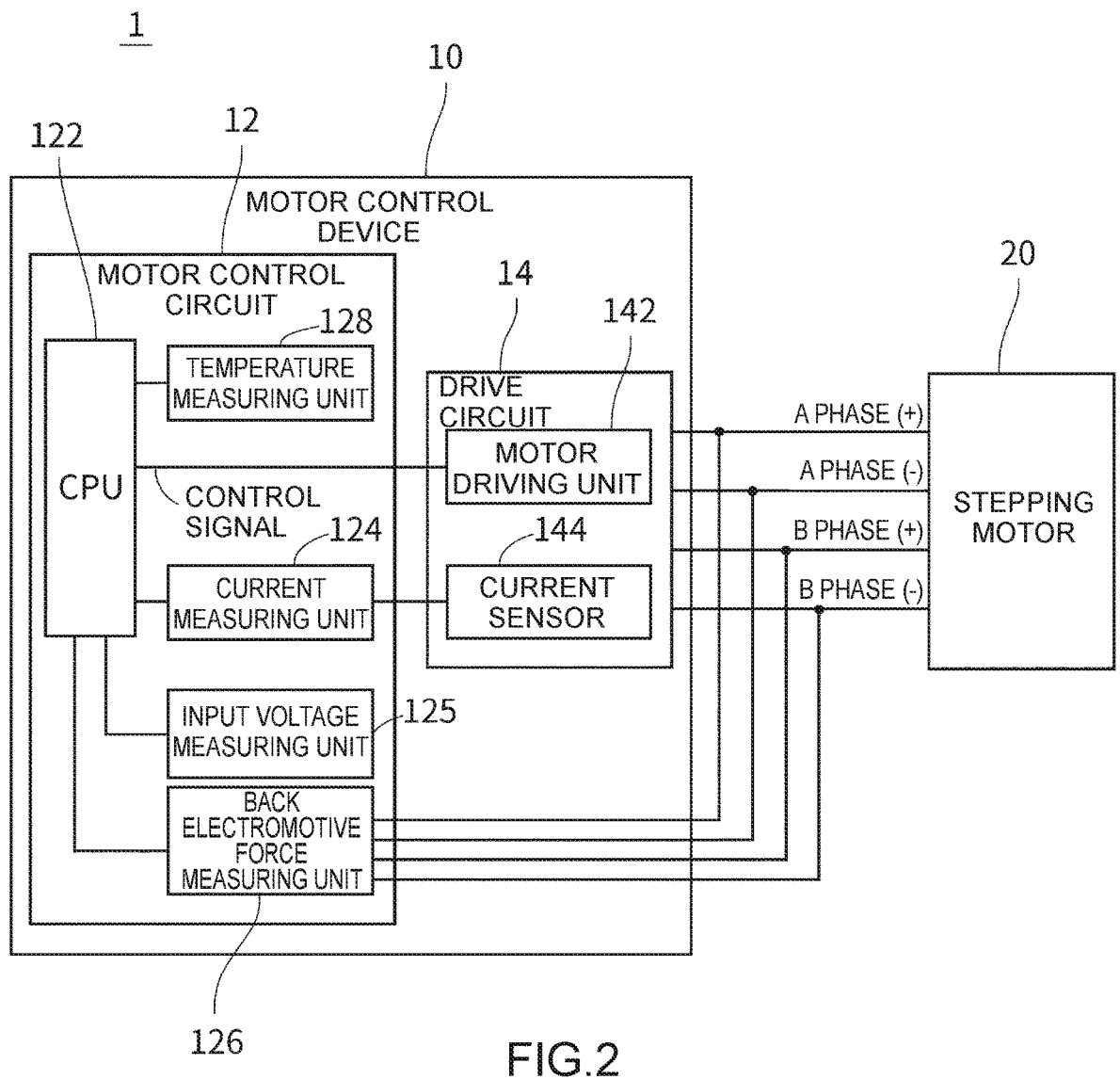
FIG. 2 is a block diagram of a motor and a motor control device constituting an actuator according to an embodiment of the present disclosure.

FIG. 2 is a block diagram of the motor and the motor control device which constitute the actuator according to an embodiment of the present disclosure.

As shown in FIG. 2, the actuator 1 includes the motor control device 10 and the stepping motor 20. The stepping motor 20 is driven by 2-phase excitation of an A phase and a B phase, for example. The stepping motor 20 has an A-phase coil and a B-phase coil (shown in FIG. 3). The stepping motor 20 is driven by supplying drive power to the coil of each phase from the motor control device 10. The actuator 1 is used, for example, for an air conditioner installed in a vehicle, and the like. The intended use of the stepping motor 20 and the actuator 1 is not limited to this application.

The motor control device 10 includes the motor control circuit 12 and the drive circuit 14.

The drive circuit 14 has a motor driving unit 142 and a current sensor 144. The drive circuit 14 supplies drive power to the stepping motor 20 to drive the stepping motor 20.

The motor control circuit 12 includes a CPU (central processing unit; an example of a determination threshold value setting unit, an example of a determination unit) 122, a current measuring unit 124, an input voltage measuring unit 125, a back electromotive force measuring unit 126, and a temperature measuring unit 128. The motor control circuit 12 controls driving of the stepping motor 20 by controlling the drive circuit 14. In the present embodiment, the motor control circuit 12 is packaged as an IC (integrated circuit).

The motor driving unit 142 applies a voltage to the coil of each phase of the stepping motor 20. A control signal is transmitted from CPU 122 to the motor driving unit 142. The motor driving unit 142 applies the voltage based on the control signal. In the present embodiment, the drive circuit 14 and the stepping motor 20 are connected to each other via four lines of an A-phase positive electrode (+), an A-phase negative electrode (−), a B-phase positive electrode (+) and a B-phase negative electrode. The motor driving unit 142 supplies drive power to the stepping motor 20 via each of these lines in accordance with the control signal. The control signal is a PWM signal, and the drive power varies according to the duty ratio of the PWM signal.

The current sensor 144 senses current (coil current) flowing through the coil of each phase of the stepping motor 20. The current sensor 144 outputs a sensing result of the coil current to the current measuring unit 124.

The current measuring unit 124 measures the coil current of the stepping motor 20. The sensing result of the coil current output from the current sensor 144 is input to the current measuring unit 124. The current measuring unit 124 measures the coil current based on the input sensing result. The current measuring unit 124 outputs the measurement result of the coil current to CPU 122.

The input voltage measuring unit 125 measures the input voltage to be input to the motor control device 10. The input voltage measuring unit 125 outputs the measurement result of the input voltage to CPU 122.

The back electromotive force measuring unit 126 measures back electromotive force induced in a coil whose energization has been stopped out of the coils of the plural phases of the stepping motor 20. In the present embodiment, the back electromotive force measuring unit 126 is connected to each of four lines for connecting the drive circuit 14 and the stepping motor 20. The back electromotive force measuring unit 126 outputs a measurement result of the back electromotive force to CPU 122.

The temperature measuring unit 128 is, for example, a temperature sensor for measuring the internal temperature of the IC of the motor control circuit 12. The temperature measuring unit 128 outputs temperature information indicating the temperature of the motor control circuit 12 to CPU 122.

In the present embodiment, CPU 122 functions as a determination threshold value setting unit and a determination unit. CPU 122 receives a measurement result of the coil current output from the current measuring unit 124, a measurement result of the input voltage output from the input voltage measuring unit 125, a measurement result of the temperature output from the temperature measuring unit 128, and a measurement result of the back electromotive force measuring unit 126. CPU 122 serves as the determination threshold value setting unit to set a determination threshold value of back electromotive force for making a determination on the step-out of the stepping motor 20 (a detection threshold value of the back electromotive force for detecting a step-out state) based on the measurement result of the input voltage measuring unit 125 and the measurement result of the temperature measuring unit 128. CPU 122 performs the setting of the determination threshold value based on a preset determination reference value of the back electromotive force for each of plural partial areas that are sectioned in a matrix form with threshold values relating to the input voltage and threshold values relating to the temperature. Furthermore, CPU 122 serves as the determination unit to determine whether step-out has occurred in the stepping motor 20 according to the determination threshold value set by the determination threshold value setting unit and the measurement result of the back electromotive force measuring unit 126 (step-out determination). CPU 122 generates a control signal according to the result of the step-out determination, and outputs the generated control signal to the motor driving unit 142. Then, when it is determined that step-out has occurred in the stepping motor 20, the motor driving unit 142 stops the output of the drive signal of the stepping motor 20 based on the control signal.

Figure 3:
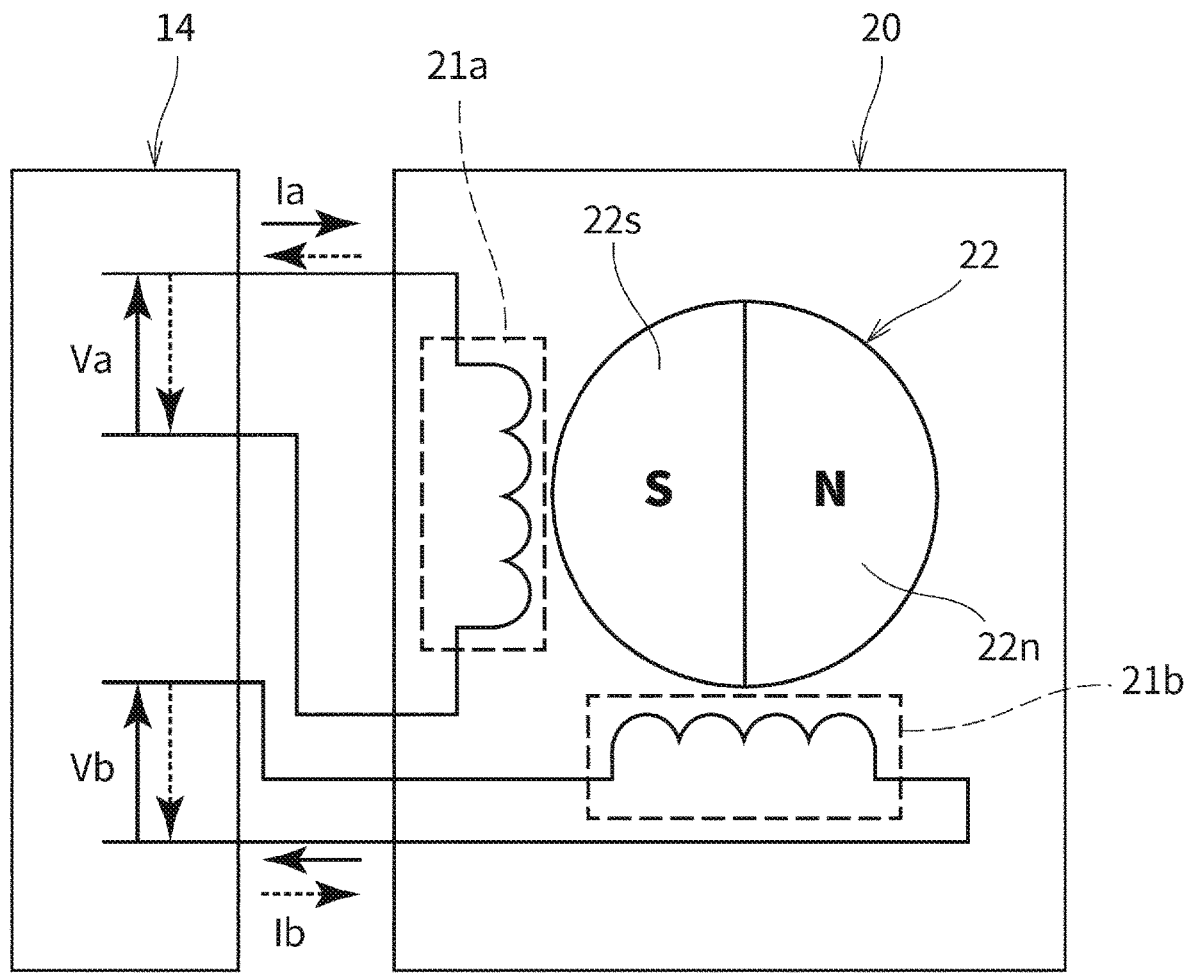
FIG. 3 is a schematic diagram showing a circuit configuration of a stepping motor.

FIG. 3 is a diagram schematically showing a circuit configuration of the stepping motor 20.

As shown in FIG. 3, the stepping motor 20 has two coils 21a and 21b, a rotor 22, and plural stator yokes (not shown).

Each of the coils 21a and 21b is a coil for exciting the stator yokes. Each of the coils 21a and 21b is connected to the drive circuit 14. The coil 21a is an A-phase coil. The coil 21b is a B-phase coil. Coil currents of different phases are made to flow through the coils 21a and 21b, respectively.

The rotor 22 includes a permanent magnet which is magnetized in a multipolar way so that the S-poles 22s and N-poles 22n are alternately reversed along a peripheral direction. In FIG. 3, the rotor 22 is illustrated in such a simplified manner that one S-pole 22s and one N-pole 22n are provided. The stator yokes are arranged around the rotor 22 to be close to the outer peripheral portion of the rotor 22. The rotor 22 is rotated by periodically switching the phase of the coil current flowing through each of the coils 21a and 21b.

Here, in the present embodiment, the back electromotive force is measured as follows, for example. When the direction of the coil current 1a, 1b flowing through the coil 21a, 21b of one of the phases A and B is switched, CPU 122 temporarily stops application of a pulse voltage to the coil 21a, 21b (stop period). During such a stop period, the back electromotive force measuring unit 126 individually measures the back electromotive force induced in the coil 21a, 21b of the phase in which the application of the pulse voltage is stopped (for each phase or for each coil).

That is, when the polarity of the coil current 1a changes, the application of the pulse voltage to the coil 21a is stopped so that the coil current 1a becomes zero. During this stop period, back electromotive force is induced in the coil 21a. When the polarity of the coil current 1b changes, the application of the pulse voltage to the coil 21b is stopped so that the coil current 1b becomes zero. During this stop period, back electromotive force is induced in the coil 21b. The back electromotive force measuring unit 126 measures the back electromotive force.

More specifically, during driving of the stepping motor 20, under the control of the CPU 122, a pulse voltage is applied to the coils 21a and 21b (PWM control). As a result, the coil currents 1a and 1b flow through the coils 21a and 21b, respectively.

After the PWM control is performed, energization stop processing and constant voltage control are executed. For example, when the energization stop processing of the coil 21a is performed, the application of the pulse voltage to the coil 21a is stopped only for a predetermined stop period. As a result, the coil current 1a becomes zero. The stop period is arbitrarily set by CPU 122. For example, CPU 122 may set a predetermined stop period or may accept the setting of a stop period from the outside of the motor control device 10. During such a stop period, the back electromotive force measuring unit 126 measures the back electromotive force induced in the coil 21a. A measurement result of the back electromotive force is supplied to CPU 122.

In the present embodiment, when the energization stop processing is performed on the coil 21a as described above, CPU 122 sets the coil voltage Vb of the coil 21b to a fixed voltage during the stop period as the constant voltage control. That is, during the stop period, CPU 122 sets all the other coils excluding the coil under measurement of the back electromotive force to the fixed voltage. The voltage level of the fixed voltage may be the same voltage level as the immediately preceding coil voltage (for example, a power supply voltage level or a ground (GND) level), or may be a predetermined reference voltage level. Thus, for example when the energization stop processing is performed on the coil 21a, the coil voltage Vb of the coil 21b becomes constant (in the present embodiment, for example, the level of the input voltage).

When the voltage level of the fixed voltage is the level of the input voltage, the coil current 1b of the coil 21b when the energization stop processing is performed on the coil 21a slightly increases as compared with the coil current 1b in the period during which the PWM control described above is performed. Since the coil voltage Vb during the stop period is constant, noise caused by the application of the coil voltage Vb does not occur. As a result, noise is not superimposed on the coil voltage Va of the coil 21a during the stop period. That is, by measuring the coil voltage Va during the stop period, the back electromotive force induced in the coil 21a can be accurately measured. As a result, erroneous detection of a step-out state can be prevented.

When the back electromotive force is measured as described above, CPU 122 determines whether a step-out of the stepping motor 20 has occurred according to the determination threshold set as described later and the measurement result of the back electromotive force measuring unit 126.

Specifically, CPU 122 determines whether the measured back electromotive force satisfies the determination threshold value of the back electromotive force. In other words, CPU 122 compares the value of the thus-obtained back electromotive force with the set determination threshold value. It can be determined according to the comparison result whether step-out has occurred in the stepping motor 20. For example, when the value of the measured back electromotive force has reached the determination threshold value, CPU 122 determines that step-out has occurred in the stepping motor 20.

In the present embodiment, CPU 122 sets the determination threshold value of the back electromotive force for making the determination on the step-out of the stepping motor 20 based on the measurement result of the temperature and the measurement result of the input voltage as follows.

CPU 122 sets the determination threshold value of the back electromotive force based on the determination reference value of the back electromotive force which is preset in the motor control circuit 12. The determination reference value is preset for each of the plural partial areas that are sectioned in a matrix form with threshold values relating to the input voltage and threshold values relating to the temperature. In the present embodiment, a determination reference value is preset for each of nine partial areas that are sectioned in a matrix form of 3 rows and 3 columns (3×3) with two threshold values relating to the input voltage and two threshold values relating to the temperature.

Figure 4:
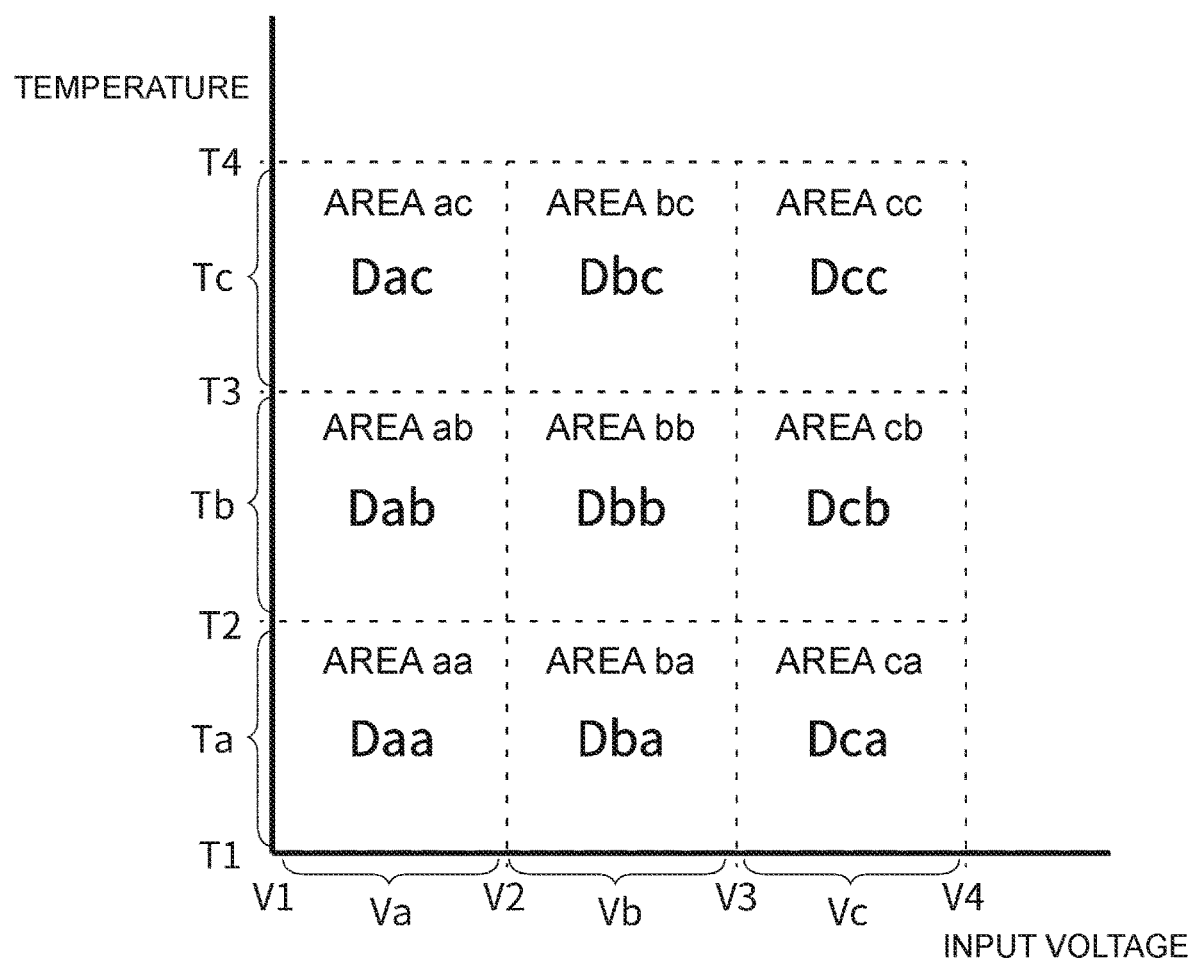
FIG. 4 is a diagram showing a setting example of a determination reference value.

FIG. 4 is a diagram showing a setting example of the determination reference value.

FIG. 4 shows an example in which one determination reference value Daa, Dab, Dac, Dba, Dbb, Dbc, Dca, Dcb, Dcc is set for each of partial areas aa, ab, ac, ba, bb, bc, ca, cb, cc of the 3 rows and the 3 columns as described above. That is, each of a total of nine determination reference values Daa to Dcc is set for each of nine partial areas aa to cc.

The partial areas aa to cc are sectioned in a matrix form with threshold values V2 and V3 related to the input voltage and threshold values T2 and T3 related to the temperature. That is, the range of input voltages from V1 to V4 is divided into three voltage ranges (sectioned areas) Va, Vb, and Vc by the threshold values V2 and V3. The low voltage range Va is a range from not less than V1 to less than V2. The middle voltage range Vb is a range from not less than V2 to less than V3. The high voltage range Vc is a range from not less than V3 to less than V4. Furthermore, the range of input temperatures from T1 to T4 is divided into three temperature ranges (sectioned areas) Ta, Tb, and Tc by the threshold values T2 and T3. The low temperature range Ta is a range from not less than T1 to less than T2. The middle temperature range Tb is a range from not less than T2 to less than T3. The high temperature range Tc is a range from not less than T3 to less than T4. By combining the three voltage ranges Va, Vb, and Vc and the three temperature ranges Ta, Tb, and Tc, the nine partial areas from aa to cc are formed in the form of a matrix.

CPU 122 specifies a partial area corresponding to a current state among the nine partial areas aa to cc as a control area based on the measurement result of the input temperature and the measurement result of the input voltage. Then, CPU 122 reads out a determination reference value corresponding to the specified control area, and sets the read-out determination reference value as a determination threshold value of the back electromotive force. According to the set determination threshold value and the measurement result of the back electromotive force measuring unit 126, CPU 122 determines whether step-out has occurred in the stepping motor 20.

For a low voltage range, a middle voltage range and a high voltage range which are sectioned by two threshold values with respect to the input voltage, the determination reference value of the back electromotive force is set so as to be larger in the middle voltage range than that in the low voltage range and also larger in the high voltage range than that in the middle voltage range. In addition, for a low temperature range, a middle temperature range, and a high temperature range which are sectioned by two threshold values with respect to the temperature, the determination reference value of the back electromotive force is set so as to be larger in the high temperature range than that in the low temperature range and also larger in the middle temperature range than that in the high temperature range.

Specifically, with respect to the input voltage, the determination reference values Daa to Dcc are set so that the determination reference value is larger in the middle voltage range Vb than that in the low voltage range Va and also larger in the high voltage range Vc than that in the middle voltage range Vb. In addition, with respect to the temperature, the determination reference values Daa to Dcc are set so that the determination reference value is larger in the high temperature range Tc than that in the low temperature range Ta and also larger in the middle temperature range Tb than that in the high temperature range Tc.

That is, the magnitudes of the determination reference values Daa to Dac have the following relationship.

With respect to the input voltage, (in the case of the voltage range Va)≤(in the case of Vb)≤(in the case of Vc)

With respect to the temperature, (in the case of the temperature range Ta)≤(in the case of Tc)≤(in the case of Tb)

For example, when comparing the determination reference values under the condition of the low temperature range Ta, the following relationship is established.

(Determination reference value Daa in a low voltage and low temperature area aa)≤(determination reference value Dba in a middle voltage and low temperature area ba)≤(determination reference value Dca in a high voltage and low temperature area ca)

Furthermore, for example when comparing the determination reference values under the condition of the low voltage range Va, the following relationship is established.

(Determination reference value Daa in a low voltage and low temperature area aa)≤(determination reference value Dac in a low voltage and high temperature area ac)≤(determination reference value Dab in a low voltage and middle temperature area ab)

In the present embodiment, the respective determination reference values are set so as to satisfy the following relationship between the input voltage and the determination reference value of the back electromotive force.

In the low voltage range Va, the torque decreases and the back electromotive force becomes relatively low. Therefore, the determination reference value becomes a relatively small value.

On the other hand, in the high voltage range Vc, the torque sufficiently increases and the back electromotive force becomes relatively high. Therefore, the determination reference value becomes a relatively large value.

Furthermore, the respective determination reference values satisfy the following relationship between the temperature and the determination reference value of the back electromotive force.

In the low temperature range Ta, the torque decreases because grease coated on movable parts such as gears 26, 31, 32, and 33 and the like in an actuator 1 hardens and thus the load of the stepping motor 20 becomes large. Since the back electromotive force is relatively low, the determination reference value is a relatively small value.

Furthermore, in the high temperature range Tc, the torque is low because resin on the gears 26, 31, 32, and 33 and the like expands to cause the gears to be clogged, so that the load on the stepping motor 20 increases. Therefore, as in the case of the low temperature environment, the determination reference value is a relatively small value. Note that the extent to which the load of the stepping motor 20 increases is higher when the viscosity of the grease increases due to the decrease of the temperature than that when the material expands due to the increase in temperature. Therefore, it is desirable to make the determination reference value in the low temperature range Ta lower than that in the high temperature range Tc. In addition, it is desirable to make the determination reference value lower in the high temperature range Tc than that in the middle temperature range Tb.

In the present embodiment, the input voltage, the temperature, and the determination reference value of the back electromotive force are set as follows, for example. Here, an actuator 1 which is used in a room temperature environment and in which a reference input voltage is approximately 12 V is assumed.

With respect to the threshold values, the lower limit value V1 and the upper limit value V4 of the input voltage, the lower limit value T1 and the upper limit value T4 of the temperature may be appropriately set. These lower limit values V1, T1 and upper limit values V4, T4 may not be set, and in this case, the low voltage range Va is a range of all voltages which are not more than the threshold V2, the high voltage range Vc is a range of all voltages which are not less than the threshold value V3. Furthermore, the low temperature range Ta is a range of all temperatures which are not more than the threshold value T2, and the high temperature range Tc is a range of all temperatures which are not less than the threshold value T3.

Specific values of the determination reference value and the threshold values of the voltage and the temperature can be appropriately set according to the applications and specifications of the actuator 1 and the stepping motor 20, the magnitude of the input voltage, a variation amount of the input voltage, assumed temperature, etc. by using an experiment result, a simulation result or the like.

Figure 5:
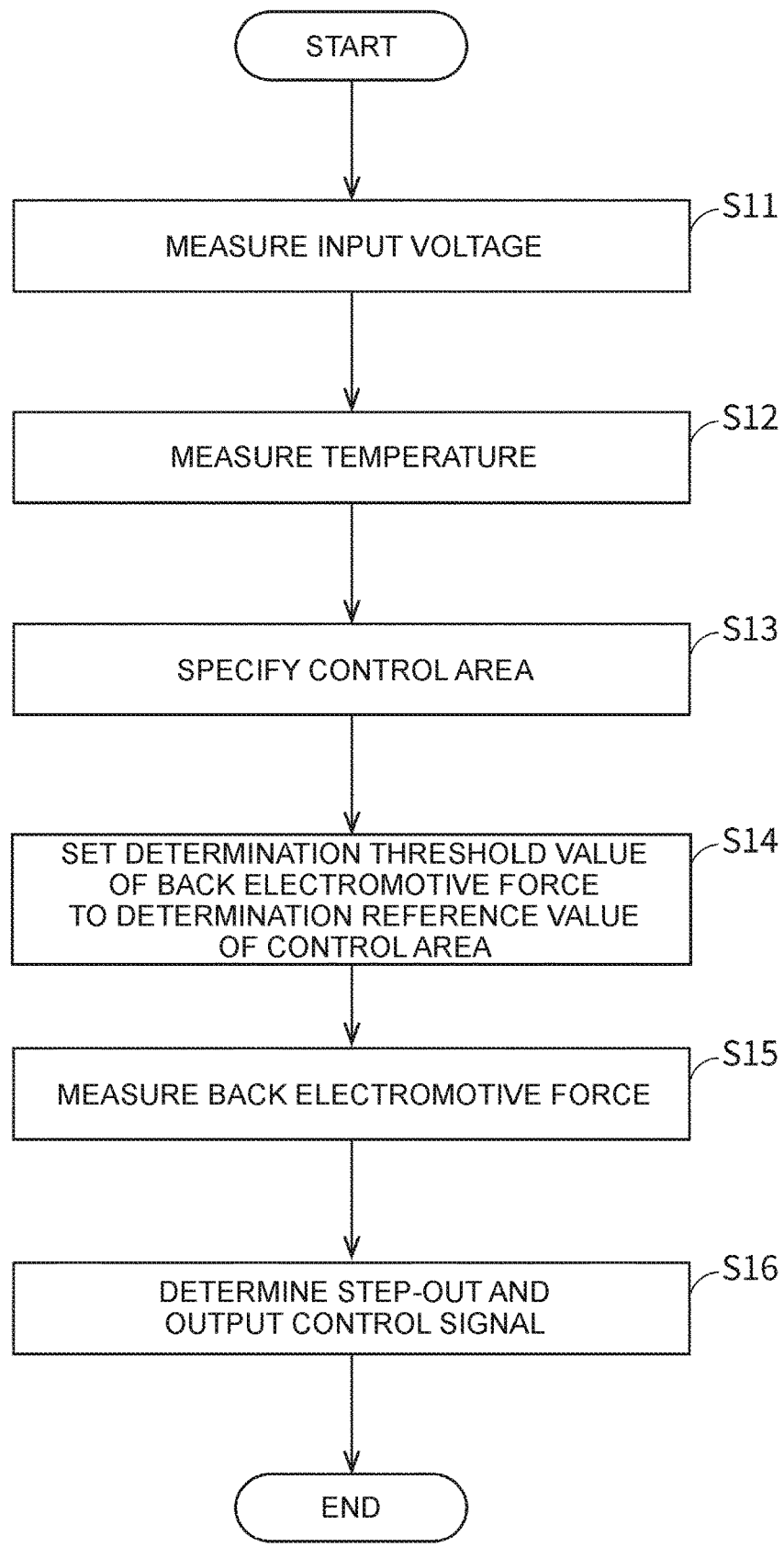
FIG. 5 is a flowchart roughly showing determination threshold value setting processing of back electromotive force of a stepping motor that is performed by a motor control device.

FIG. 5 is a flowchart roughly describing the determination threshold value setting processing of the back electromotive force of the stepping motor 20 performed by the motor control device 10.

As shown in FIG. 5, the input voltage is measured by the input voltage measuring unit 125 (input voltage measuring step) in step S11.

In step S12, the temperature is measured by the temperature measuring unit 128 (temperature measuring step). It is to be noted that steps S11 and S12 may be performed simultaneously or with the order of the steps being reversed.

In step S13, CPU 122 specifies a partial area containing a current state as a control area among the nine partial areas from aa to cc based on the measurement result of the temperature and the measurement result of the input voltage.

In step S14, CPU 122 reads out the determination reference value of the back electromotive force corresponding to the specified control area, and sets the read-out determination reference value as the determination threshold value of the back electromotive force (determination threshold value setting step).

In step S15, when the direction of the coil current 1a, 1b flowing through the coil 21a, 21b of one of the phases A and B is switched, the back electromotive force measuring unit 126 measures, for each coil, the back electromotive force induced in the coil 21a, 21b of the phase in which the application of the pulse voltage is stopped during a period in which the application of the pulse voltage to the coil 21a, 21b is temporarily stopped (back electromotive force measuring step).

In step S16, CPU 122 outputs a control signal according to the measurement result of the coil current. CPU 122 determines whether step-out has occurred in the stepping motor 20 according to the set determination threshold value and the value of the back electromotive force measured by the back electromotive force measuring unit 126 (determination step), and outputs a control signal based on the determination result.

For example, the processing shown in FIG. 5 is performed after CPU 122 receives a command for driving the stepping motor 20. Then, the processing shown in FIG. 5 is finished, and the determination threshold value is set.

[Effect of Embodiment]

In the actuator 1 using the motor control device 10 configured as described above, the determination threshold value of the back electromotive force can be set based on the determination reference value of the back electromotive force which is preset for each partial area determined from the relationship between the input voltage and the temperature. Accordingly, the determination threshold value can be set so that the step-out determination of the stepping motor 20 can be performed with high precision under a wide condition. Since it is possible to accurately perform the step-out determination on the stepping motor 20 even under a wide condition, the operation of the actuator 1 can be appropriately controlled.

The determination reference value is set according to the range of the input voltage. Therefore, an appropriate determination threshold value can be set according to variation of the back electromotive force which occurs due to variation of the torque caused by the influence of the input voltage. Furthermore, it is possible to arbitrarily set threshold values for sectioning the range of the input voltage, and it is possible to finely adjust the determination threshold value according to each voltage range.

In addition, the determination reference value is set according to the temperature range. Therefore, an appropriate determination threshold value can be set according to variation of the back electromotive force which occurs due to variation of the torque caused by the influence of the temperature. Furthermore, it is possible to arbitrarily set threshold values for sectioning the range of the temperature, and it is possible to finely adjust the determination threshold value according to each temperature range. Particularly, in the present embodiment, the internal temperature of the IC is measured and used to determine the determination threshold values. Since it is possible to measure temperature close to the temperature of a site that is slightly away from the stepping motor 20 which may vary in temperature according to the driving condition of the stepping motor 20, and causes increase of the load due to the influence of the temperature, and also determine the determination threshold values by using the measurement result of the temperature, the step-out determination can be performed with appropriate determination threshold values corresponding to the condition. Note that the temperature of another site may be measured regardless of the internal temperature of the IC.

The partial areas are set in a matrix form with respect to the input voltage range and the temperature range, and the determination reference value can be set for each partial area. Therefore, it is possible to set an optimum determination threshold value in consideration of the mutual influence of the input voltage and the temperature according to the conditions of the input voltage and the temperature when the actuator 1 is used. Particularly, it is possible to solve the following problem which has been conventionally encountered. That is, in the case where the determination threshold value is set to a low value in order to secure the torque when the temperature is low and the input voltage is low, the precision of the step-out determination decreases when the input voltage is high. On the other hand, in the case where the determination threshold value is set to a high value in order to secure the determination precision when the input voltage is high, it is impossible to secure the torque when the input voltage is low. That is, it is possible to secure the torque under a low-temperature and low-voltage condition and also enhance the precision of the step-out determination under a low-temperature and high-voltage condition.

[Others]

The number of divisions of the matrix may be equal to 2 rows by 2 columns (2×2) or more, and the number of threshold values for the input voltage and the number of threshold values for temperature may be different from each other. The number of divisions of the matrix may be appropriately set, for example, like 2×3, 2×4, 4×4 or the like.

Figure 6:
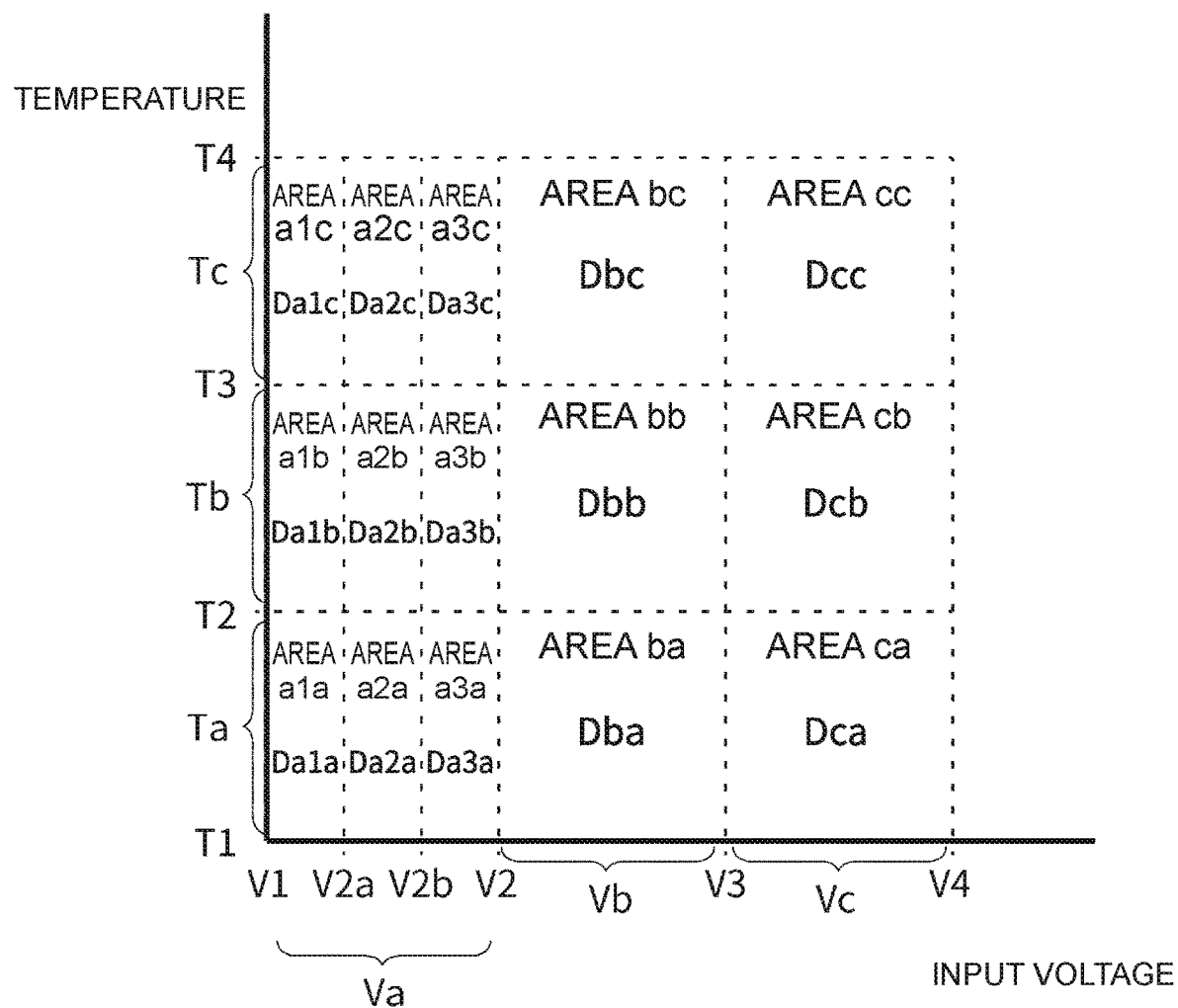
FIG. 6 is a diagram showing a modification of the setting example of the determination reference value.

FIG. 6 is a diagram showing a variant of the setting example of the determination reference value.

FIG. 6 shows an example in which with respect to the foregoing matrix shown in FIG. 4, particularly the low voltage range Va is further divided into three, that is, the area aa is divided into areas a1a, a2a, and a3a, the area ab is divided into areas a1b, a2b, and a3b, and the area ac is divided into areas a1c, a2c, and a3c. That is, a matrix-shaped partial area of 3 rows and 5 columns is provided. In other words, in the example shown in FIG. 6, fifteen partial areas which are sectioned in a matrix form by two threshold values T2 and T3 for temperature and four threshold values V2a, V2b, V2, and V3 for the input voltage are provided. As described above, the determination reference values Da1a, Data, Da3a, Da1b, Da2b, Da3b, Da1c, Da2c, and Da3c can be set particularly so that the low voltage range can be finely sectioned and the step-out determination can be appropriately performed with respect to the value of the back electromotive force corresponding to the torque under each condition. Therefore, it is possible to perform the step-out determination of the stepping motor 20 more appropriately and more precisely under each condition, whereby the actuator 1 is enabled to operate appropriately.

The configuration of the above-described actuator is merely an example, and it may be a configuration different from the above-described configuration.

Only a part of the control circuit may be configured as an integrated circuit. Furthermore, a part of a portion of the motor control device which is different from the control circuit may be configured as an integrated circuit. The whole of the motor control device may be configured as an integrated circuit.

In the above-described embodiment, the measurement of the back electromotive force is performed with the other coils being set to a fixed voltage while the control current of the coil of each phase is stopped, but the present disclosure is not limited to this manner. Regardless of whether the other coils are set to a fixed voltage, during a period when the control current of a coil of a certain phase is stopped, the back electromotive force for the coil may be measured. Furthermore, the back electromotive force may be appropriately measured at various timings.

The hardware configurations of the actuator such as the stepping motor and the motor control device are not limited to the foregoing configurations.

The processing in the above-described embodiment may be performed by software or may be performed by using a hardware circuit.

A program for executing the processing in the above-described embodiment may be provided, and the program may be recorded on a non-transitory computer readable medium such as CD-ROM, a flexible disk, a hard disk, ROM, RAM, or a memory card to be provided to a user. The program may be downloaded to a device via a communication line such as the Internet. The processing described in the flowcharts and the text is executed by the CPU or the like in accordance with the program.

It is to he understood that the above-described embodiment is illustrative in all respects and not restrictive. The scope of the present disclosure is defined not by the foregoing description, but by the claims, and the intent is that it includes meanings equivalent to the claims and all variants within the claims.

What is claimed is:

1. A motor control circuit for use in a motor control device for driving a stepping motor, the motor control circuit comprising:
   an input voltage measuring unit for measuring an input voltage input to the motor control device;
   a temperature measuring unit for measuring temperature;
   a back electromotive force measuring unit for measuring back electromotive force induced in a coil for which energization is stopped out of the coils of a plurality of phases in the stepping motor;
   a determination threshold value setting unit for setting a determination threshold value of back electromotive force for making a determination on step-out of the stepping motor based on a measurement result of the input voltage measuring unit and a measurement result of the temperature measuring unit; and
   a determination unit for making a determination on step-out of the stepping motor based on a measurement result of the back electromotive force measuring unit and the determination threshold value set by the determination threshold value setting unit, wherein the determination threshold value setting unit sets the determination threshold value based on a determination reference value of the back electromotive force that is preset for each of a plurality of partial areas sectioned in a matrix form with a threshold value relating to the input voltage and a threshold value relating to the temperature.

2. The motor control circuit according to claim 1, wherein the determination threshold value setting unit sets the determination threshold value based on the determination reference value that is preset for each of nine partial areas sectioned in a matrix form of 3 rows and 3 columns with two threshold values relating to the input voltage and two threshold values relating to the temperature.

3. The motor control circuit according to claim 2, wherein for a low voltage range, a middle voltage range and a high voltage range that are sectioned by the two threshold values with respect to the input voltage, the determination reference value is set so as to be larger in the middle voltage range than that in the low voltage range and also larger in the high voltage range than that in the middle voltage range, and, furthermore, for a low temperature range, a middle temperature range and a high temperature range that are sectioned by the two threshold values with respect to the temperature, the determination reference value is set so as to be larger in the high temperature range than that in the low temperature range and also larger in the middle temperature range than that in the high temperature range.

4. A motor control device comprising:
   the motor control circuit according to claim 1; and
   a driving circuit for driving the stepping motor, wherein the motor control circuit outputs a control signal for controlling the driving circuit, and the driving circuit causes a drive current to flow through a coil of the stepping motor based on the control signal.

5. An actuator comprising:
   a stepping motor for generating driving force;
   the motor control circuit according to claim 1; and
   a driving circuit for causing a drive current to flow through a coil of the stepping motor based on a control signal output from the motor control circuit.

6. A control method for a stepping motor having coils of a plurality of phases, the control method comprising:
   an input voltage measuring step of measuring an input voltage;
   a temperature measuring step of measuring temperature;
   a determination threshold value setting step of setting a determination threshold value of back electromotive force for performing a determination on step-out of the stepping motor based on a measurement result in the input voltage measuring step and a measurement result in the temperature measuring step;
   a back electromotive force measuring step of measuring back electromotive force induced in a coil for which energization is stopped out of the coils of the plurality of phases; and
   a determination step of making a determination on step-out of the stepping motor based on a measurement result in the back electromotive force measuring step and the determination threshold value set in the determination threshold value setting step, wherein the determination threshold value setting step sets the determination threshold value based on a determination reference value of the back electromotive force that is preset for each of a plurality of partial areas sectioned in a matrix form with a threshold value relating to the input voltage and a threshold value relating to the temperature.

* * * * *